United States Patent
Liaw et al.

(10) Patent No.: US 8,980,129 B2
(45) Date of Patent: Mar. 17, 2015

(54) LIQUID-CRYSTAL COMPOUND WITH NEGATIVE DIELECTRIC ANISOTROPY, LIQUID-CRYSTAL DISPLAY, AND OPTOELECTRONIC DEVICE

(71) Applicant: Industrial Technology Research Institute, Hsinchu (TW)

(72) Inventors: Chao-Wu Liaw, New Taipei (TW);
Shih-Hsien Liu, Jhubei (TW);
Kung-Lung Cheng, Hsinchu (TW);
Jian-Wen Lin, Luzhu Township (TW);
Kuo-Chang Wang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 108 days.

(21) Appl. No.: 13/772,004

(22) Filed: Feb. 20, 2013

(65) Prior Publication Data
US 2014/0118679 A1    May 1, 2014

(30) Foreign Application Priority Data
Oct. 26, 2012   (TW) .............................. 101139633 A

(51) Int. Cl.
*C09K 19/12*   (2006.01)
*C09K 19/04*   (2006.01)
(52) U.S. Cl.
CPC ......... *C09K 19/12* (2013.01); *C09K 2019/0444* (2013.01); *C09K 2019/123* (2013.01)
USPC .................................................. 252/299.63
(58) Field of Classification Search
CPC .............................................. C09K 2019/0444
See application file for complete search history.

(56) References Cited

U.S. PATENT DOCUMENTS 4,621,901 A   11/1986 Petrzilka et al.
4,695,131 A    9/1987 Balkwill et al.
(Continued)

FOREIGN PATENT DOCUMENTS

TW   153658   3/1991
TW   203096   4/1993
(Continued)

OTHER PUBLICATIONS

Bremer et al., "1,1,6,7-Tetrafluoroindanes: improved liquid crystals for LCD-TV application", New J. Chem, 2005, 29, pp. 72-74.
(Continued)

*Primary Examiner* — Cynthia H Kelly
*Assistant Examiner* — Anna Malloy
(74) *Attorney, Agent, or Firm* — Birch, Stewart, Kolasch & Birch, LLP

(57) ABSTRACT

Disclosed is a liquid-crystal compound with negative dielectric anisotropy, having the chemical formula:

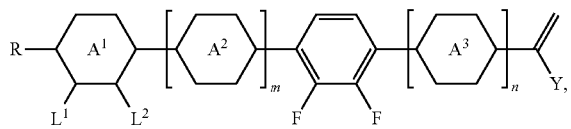

wherein $A^1$, $A^2$, and $A^3$ are independently selected from cyclohexyl group, cyclohexenyl group, or phenyl group; $L^1$ and $L^2$ are independently selected from H or F; R is selected from H, F, Cl, $C_{1-10}$ alkyl group, $C_{1-10}$ alkenyl group, $C_{1-10}$ alkoxy group, or $C_{1-10}$ ether group; Y is fluorinated methyl group; m and n are independently selected from an integer of 0-2; and $1 \leq m+n \leq 3$.

3 Claims, 2 Drawing Sheets

(56) References Cited

U.S. PATENT DOCUMENTS

| | | |
|---|---|---|
| 4,770,503 A | 9/1988 | Buchecker et al. |
| 4,911,863 A | 3/1990 | Sage et al. |
| 4,915,480 A | 4/1990 | Petrzilka et al. |
| 5,002,692 A | 3/1991 | Gray et al. |
| 5,037,576 A | 8/1991 | Gray et al. |
| 5,133,896 A | 7/1992 | Coates et al. |
| 5,194,178 A | 3/1993 | Coates et al. |
| 5,230,830 A | 7/1993 | Coates et al. |
| 5,238,602 A | 8/1993 | Petrzilka et al. |
| 5,252,253 A | 10/1993 | Gray et al. |
| 5,273,680 A | 12/1993 | Gray et al. |
| 5,334,327 A | 8/1994 | Gray et al. |
| 5,346,647 A | 9/1994 | Kelly et al. |
| 5,356,560 A | 10/1994 | Reiffenrath et al. |
| 5,356,562 A | 10/1994 | Greenfield et al. |
| 5,456,859 A | 10/1995 | Gray et al. |
| 5,482,653 A | 1/1996 | Coates et al. |
| 5,543,539 A | 8/1996 | Shimizu et al. |
| 5,578,351 A | 11/1996 | Shashidhar et al. |
| 5,582,765 A | 12/1996 | Kinsho et al. |
| 5,637,257 A | 6/1997 | Coates et al. |
| 5,744,058 A | 4/1998 | Reiffenrath et al. |
| 5,844,651 A | 12/1998 | Reimer et al. |
| 6,057,006 A | 5/2000 | Kirsch et al. |
| 6,156,232 A | 12/2000 | Shashidhar et al. |
| 7,025,901 B2 | 4/2006 | Bailey, III et al. |
| 7,211,302 B2 | 5/2007 | Manabe et al. |
| 7,390,539 B2 | 6/2008 | Saito et al. |
| 7,678,431 B2 | 3/2010 | Manabe et al. |
| 7,820,251 B2 | 10/2010 | Chen et al. |
| 2003/0222245 A1 | 12/2003 | Klasen-Memmer et al. |
| 2003/0228426 A1 | 12/2003 | Heckmeier et al. |
| 2007/0051920 A1 | 3/2007 | Klasen-Memmer et al. |
| 2007/0237907 A1 | 10/2007 | Manabe et al. |
| 2009/0123666 A1 | 5/2009 | Chen et al. |
| 2010/0309402 A1 | 12/2010 | Kobayashi et al. |
| 2011/0037024 A1 | 2/2011 | Kobayashi |
| 2011/0090450 A1 | 4/2011 | Kobayashi |
| 2011/0141418 A1 | 6/2011 | Ennis et al. |
| 2012/0164355 A1 | 6/2012 | Huang et al. |
| 2012/0190897 A1 | 7/2012 | Yamashita et al. |

FOREIGN PATENT DOCUMENTS

| | | |
|---|---|---|
| TW | 200420713 | 10/2004 |
| TW | 200920824 A | 5/2009 |
| TW | 200927892 A | 7/2009 |
| TW | I311582 B | 7/2009 |
| TW | 200942599 A | 10/2009 |
| TW | I319431 B | 1/2010 |
| TW | 201006914 A | 2/2010 |
| TW | I320801 | 2/2010 |
| TW | 201226534 A1 | 7/2012 |
| WO | WO 94/08268 A1 | 4/1994 |
| WO | WO 2011-040372 A1 | 4/2011 |

OTHER PUBLICATIONS

Leslie, "Distortion of Twisted Orientation Patterns in Liquid Crystals by Magnetic Fields", Molecular Crystals and Liquid Crystals, 1970, vol. 12, pp. 57-72.

Pauluth et al., "Advanced liquid crystals for television", Journal of Materials Chemistry, 2004, 14, pp. 1219-1227.

Schiekel et al., "Deformation of Nematic Liquid Crystals with Vertical Orientation in Electrical Fields", Applied Physics Letters, 19, 1971, pp. 391-393.

Sun et al., "Synthesis and physical properties of novel liquid crystals containing 2,3-difluorophenyl and 1,3-dioxane units", Journal of Materials Chemistry, 2003, 13, pp. 742-748.

Taiwanese Office Action, dated Feb. 18, 2014, for Taiwanese Application No. 101139633.

LIQUID-CRYSTAL COMPOUND WITH NEGATIVE DIELECTRIC ANISOTROPY, LIQUID-CRYSTAL DISPLAY, AND OPTOELECTRONIC DEVICE

CROSS REFERENCE TO RELATED APPLICATIONS

The present application is based on, and claims priority from, Taiwan Application Serial Number 101139633, filed on Oct. 26, 2012, the disclosure of which is hereby incorporated by reference herein in its entirety

TECHNICAL FIELD

The technical field relates to a liquid-crystal compound, and in particular relates to a synthesis and an application of a liquid-crystal compound with negative dielectric anisotropy.

BACKGROUND

Liquid-crystal displays (hereinafter LCD) based on the twisted nematic (hereinafter TN) mode is the most common type of flat panel display (hereinafter FPD). The conventional TN LCD utilized in wristwatches or desk calculators can only contain a small number of matrix segments (e.g. 8*8), and therefore cannot be applied in displays with high information content, such as thin-film transistor (TFT) LCDs, which actively switch a large number of segments (e.g. 1024*768). Nevertheless, despite performance improvements for TFT LCDs, conventional TN LCDs still hold advantages such as a lighter weight, smaller volume requirement, and lower power consumption. In the 1990s Based on the combination of liquid-crystal and TFT, notebook computers became prevalent since the beginning of the 1990s, and development of the electronics and materials thereof continues even now.

The prerequisite for liquid crystals is a broad nematic phase range of −40 to 100° C. in order to guarantee the so-called operating temperature range of LCDs. The clearing point of a liquid crystal is the temperature at which the liquid-crystal phase vanishes. The clearing point must be at least 10° C. higher than the operating temperature of the device. The liquid-crystal molecule can be operated in a display device. After having voltage applied, the liquid-crystal molecule switches to a perpendicular orientation, or their original direction, due to dielectric anisotropy. For example, after the positive dielectric anisotropic liquid-crystal (utilized in general TN mode or IPS mode devices) has a driving voltage applied, the molecular long axis thereof will be influenced by and run parallel to the electric field. Contrary to the positive dielectric anisotropic liquid crystal, after the negative dielectric anisotropic liquid-crystal (utilized in VA mode devices) has a driving voltage applied, the molecular long axis thereof will be perpendicular to the electric field. In addition, the liquid-crystal formula should be highly stable under UV exposure.

For achieving the above requirements, several papers and patents disclose liquid-crystal molecule designs. However, a novel liquid-crystal molecule with negative dielectric anisotropy is still desired for being highly stable under UV exposure.

SUMMARY

One embodiment of the disclosure provides a liquid-crystal compound with negative dielectric anisotropy, having the chemical formula:

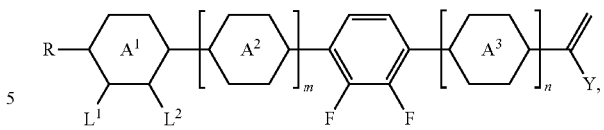

wherein $A^1$, $A^2$, and $A^3$ are independently selected from cyclohexyl group, cyclohexenyl group, or phenyl group; $L^1$ and $L^2$ are independently selected from H or F; R is selected from H, F, Cl, $C_{1-10}$ alkyl group, $C_{1-10}$ alkenyl group, $C_{1-10}$ alkoxy group, or $C_{1-10}$ ether group; Y is fluorinated methyl group; m and n are independently selected from an integer of 0-2; and $1 \leq m+n \leq 3$.

One embodiment of the disclosure provides a liquid-crystal display, comprising: a top substrate; a bottom substrate; and a liquid-crystal layer disposed between the top substrate and the bottom substrate; wherein the liquid-crystal layer comprises the described liquid-crystal compound with negative dielectric anisotropy.

One embodiment of the disclosure provides an optoelectronic device, comprising the described liquid-crystal display.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
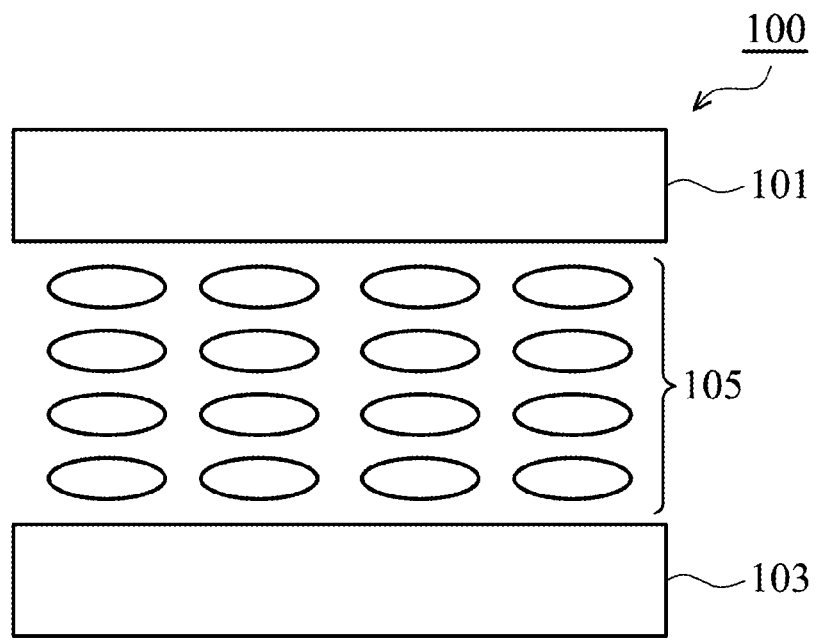
FIG. 1 shows a cross section of an LCD in one embodiment of the disclosure.

In the following detailed description, for purposes of explanation, numerous practiced without these specific details. In other instances, well-known structures and devices are schematically shown in order to simplify the drawing.

The disclosure provides a liquid-crystal compound with negative dielectric anisotropy as shown in Formula 1.

(Formula 1)

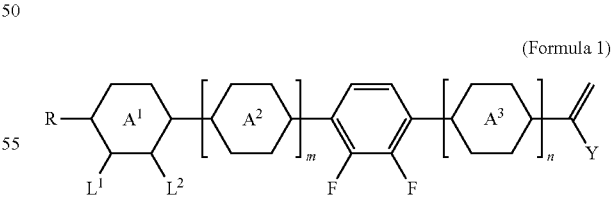

In Formula 1, $A^1$, $A^2$, and $A^3$ are independently selected from cyclohexyl group, cyclohexenyl group, or phenyl group; $L^1$ and $L^2$ are independently selected from H or F; R is selected from H, F, Cl, $C_{1-10}$ alkyl group, $C_{1-10}$ alkenyl group, $C_{1-10}$ alkoxy group, or $C_{1-10}$ ether group; Y is fluorinated methyl group; m and n are independently selected from an integer of 0-2; and $1 \leq m+n \leq 3$.

The liquid-crystal compound may include three rings, as shown in Formulae 2 to 4.

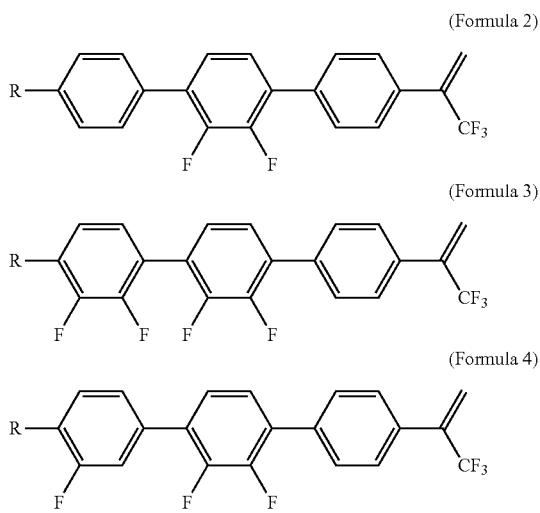

In Formula 2, R is $C_{1-8}$ alkyl group. In Formulae 3 to 4, R is $C_{1-8}$ alkoxy group.

FIG. 1 shows a cross section of an LCD in one embodiment of the invention. The LCD 100 includes a top substrate 101, a bottom substrate 103, and a liquid-crystal layer 105 disposed therebetween. In one embodiment, one of the substrates is a color filter substrate and another substrate is an array substrate. In one embodiment, one of the substrates is an array on color filter substrate (AOC) or color filter on array substrate (COA), and another substrate is a transparent substrate such as glass or plastic. The liquid-crystal layer 105 including the liquid-crystal compound of the disclosure has high stability under UV exposure.

Figure 2:
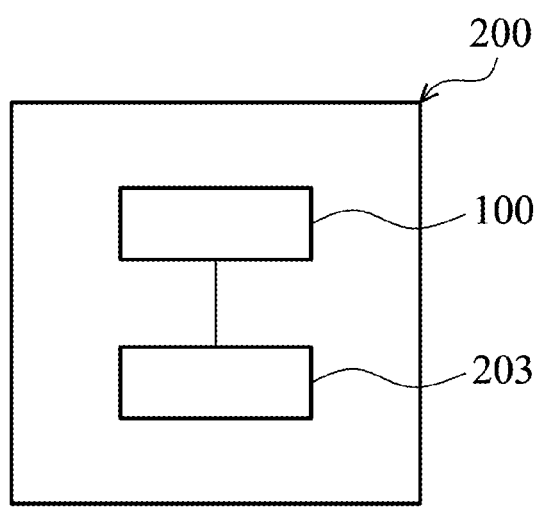
FIG. 2 is a diagram of an optoelectronic device in one embodiment of the disclosure.

FIG. 2 is a diagram of an optoelectronic device 200 in an embodiment of the invention. Referring to FIG. 2, the LCD panel 100 of the aforementioned embodiments is applied in the optoelectronic device 200 and connected to an electric device 203 such as a control device, operator device, process device, input device, memory device, driving device, illumination device, protection device, or other functional device, or combinations thereof. The electronic apparatus can be a mobile product such as a cell phone, video camera, camera, laptop computer, video game console, watch, music player, E-mail transceiver, digital photo-frame, electronic map navigation, and the like. The electronic apparatus can be an audio-visual product (such as media players and the like), a monitor, a television, a billboard (such as indoor/outdoor), a projector, and others.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

The raw materials, solvents, or silica gel for chromatography were commercially available from any fine chemical supply company, such as Affa (Lancaster), TCI, Aldrich, Acros, Merck, and the likes.

The synthesis of the liquid-crystal compound is described below: a series of compounds were completed by 2-5 reactions.

The compound properties such as electricity or other physical properties were analyzed by Bruker advance DRX-400 NMR, LC Vision LCAS(I), Autronic-MELCHERS GmbH DMS 803, Abbe refractometer, TA Q10 thermal differential scanning calorimetry (DSC), Olympus Mx40 polarized optical microscope, or other related instruments.

Synthesis Example 1

50 mL of 1,2-difluorobenzen 1 and 100 mL of anhydrous tetrahydrofuran (THF) were put into a reaction bottle under nitrogen. The reaction bottle was cooled to a temperature of −78° C., 55 mmol of n-butyl lithium was then slowly added into the reaction bottle to stir at −78° C. for 2 hours, 55 mmol of trimethoxyborane was then added into the reaction bottle to stir for 30 minutes, and hydrochloric acid solution was then added into the reaction bottle to stop the reaction. The resulting mixture was extracted by ethyl acetate and water to collect an organic layer of the extraction. The organic layer was dried by anhydrous magnesium sulfate and then vacuum concentrated to obtain a white solid product 2 (yield=90%). The above reaction is shown as Formula 5.

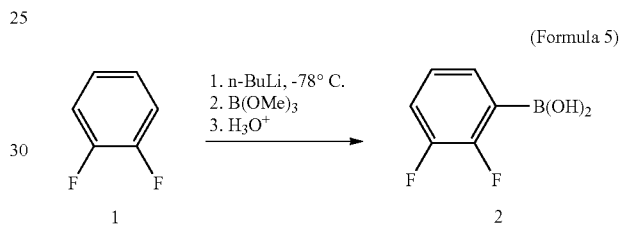

Example 1

50 mL of p-dibromobenzene 8 and 150 mL of anhydrous THF were put into a reaction bottle under nitrogen. The reaction bottle was cooled to a temperature of −78° C., 55 mmol of n-butyl lithium was then slowly added into the reaction bottle to stir at −78° C. for 1 hour, 60 mmol of ethyl trifluoroacetate was then added into the reaction bottle to stir for 30 minutes, and hydrochloric acid solution was then added into the reaction bottle to stop the reaction. The resulting mixture was extracted by ethyl acetate and water to collect an organic layer of the extraction. The organic layer was dried by anhydrous magnesium sulfate and then vacuum concentrated to obtain a pale yellow crude. The crude was purified by chromatography of a silica column to obtain a pale yellow liquid 9 (yield=70%).

21.3 mmole of methyltriphenylphosphonium bromide and 22.8 mmol of potassium t-butoxide were put into a reaction bottle under nitrogen. The reaction bottle was cooled to a temperature of 0° C., 60 mL of anhydrous THF was then added into the reaction bottle to stir at 0° C. for 2 hours until the reaction solution being orange yellow, and 20 mmol of compound 9 was then slowly added into the reaction bottle. The reaction was warmed to room temperature and reacted at room temperature for 2 hours. The resulting mixture was vacuum dried to remove the solvent thereof, and then extracted by n-hexane and water to collect an organic layer of the extraction. The organic layer was dried by anhydrous magnesium sulfate and then vacuum concentrated to obtain a crude. The crude was purified by chromatography of a silica column with n-hexane eluent to obtain a pale yellow liquid 10 (yield=60%).

20 mmol of bromide 11, 20 mmol of boride 2, 1 mmol of Pd(PPh$_3$)$_4$, 60 mmol of Na$_2$CO$_3$, and 50 mL of isopropyl alcohol (IPA) were put into a reaction bottle under nitrogen. The mixture in the reaction bottle was refluxed to react overnight, and then cooled to room temperature. The resulting mixture was vacuum filtered to collect filtrate. The filtrate was vacuum concentrated to obtain crude. The crude was purified by chromatography of a silica column with n-hexane eluent to obtain a pale yellow liquid 12 (yield=90%).

17 mmol of the pale yellow liquid 12 and 100 mL of anhydrous THF were put into a reaction bottle under nitrogen. The reaction bottle was cooled to a temperature of −78° C., 19 mmol of n-butyl lithium was then slowly added into the reaction bottle to stir at −78° C. for 2 hours, 20 mmol of trimethoxyborane was then added into the reaction bottle to stir for 30 minutes, and hydrochloric acid solution was then added into the reaction bottle to stop the reaction. The resulting mixture was extracted by ethyl acetate and water to collect an organic layer of the extraction. The organic layer was washed by water and saturated saline, dried by anhydrous magnesium sulfate, and then vacuum concentrated to obtain a white solid boride 13 (yield=88%).

5 mmol of the pale yellow liquid 10, 5 mmol of the boride 13, 0.25 mmol of Pd(PPh$_3$)$_4$, 15 mmol of Na$_2$CO$_3$, and 20 mL of IPA were put into a reaction bottle under nitrogen. The mixture in the reaction bottle was refluxed to react overnight, and then cooled to room temperature. The resulting mixture was vacuum filtered to collect filtrate. The filtrate was vacuum concentrated to obtain crude. The crude was purified by chromatography of a silica column with n-hexane eluent to obtain a white solid 4BB(FF)BVTf (yield=70%). The above reaction is shown as Formula 6. The white solid 4BB(FF)BVTf had a dielectric anisotropy (Δ∈) of −1.39, a birefringent index (Δn) of 0.238, and a clearing point of 116.1° C. The white solid 4BB(FF)BVTf was mixed with a liquid-crystal mixture Host-2 as described below to measure its dielectric anisotropy (Δ∈) and the birefringent index (Δn), and the dielectric anisotropy (Δ∈) and the birefringent index (Δn) of the white solid 4BB(FF)BVTf was then calculated by extrapolation. The white solid 4BB(FF)BVTf has a spectrum: $^1$H NMR (400 MHz, CDCl$_3$) δ (ppm); 7.62 (d, J=7.6 Hz, 2H), 7.60 (d, J=11.7, 2H), 7.51 (d, J=8.1, 2H), 7.30-7.26 (m, 4H), 6.01 (s, 1H), 5.86 (s, 1H), 2.69 (t, J=7.7 Hz, 2H), 1.67 (q, J=7.3 Hz, 2H), 1.41 (sex, J=7.4 Hz, 2H), 0.97 (t, J=7.3 Hz, 3H).

(Formula 6)

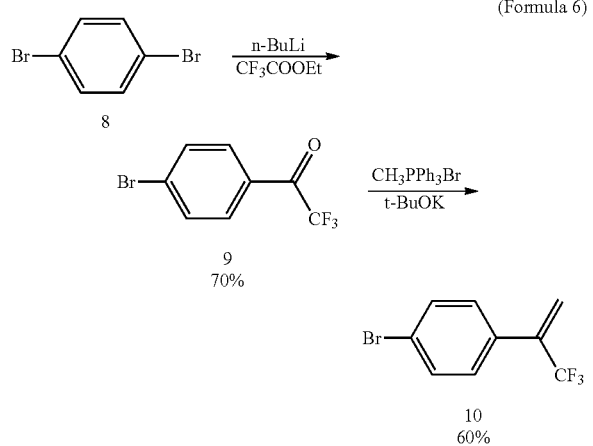

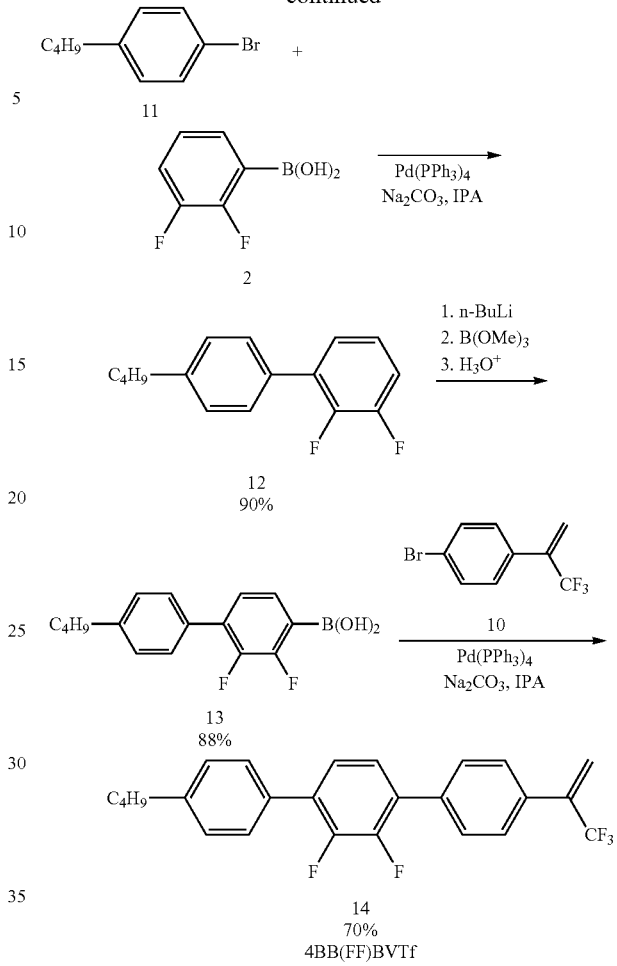

Example 2

30 mmol of 4-bromo-2-fluorophenol (15), 60 mmol of bromoethane, 60 mmol of sodium hydroxide, 3 mmol of tetrabutyl ammonium bromide (TBAB), and 30 mL of water were put into a reaction bottle, and then heated to 70° C. to react overnight. The reaction was cooled to room temperature, and then extracted by ethyl acetate and water to collect an organic layer of the extraction. The organic layer was dried by anhydrous magnesium sulfate, and then vacuum concentrated to obtain a pale yellow liquid 16 (yield=95%).

20 mmol of the pale yellow liquid 16, 20 mmol of the boride 2, 1 mmol of Pd(PPh$_3$)$_4$, 60 mmol of Na$_2$CO$_3$, and 50 mL of IPA were put into a reaction bottle under nitrogen. The mixture in the reaction bottle was refluxed to react overnight, and then cooled to room temperature. The resulting mixture was vacuum filtered to collect filtrate. The filtrate was vacuum concentrated to obtain crude. The crude was purified by chromatography of a silica column with n-hexane/ethyl acetate eluent to obtain a white solid 17 (yield=80%).

10 mmol of the white solid 17 and 30 mL of anhydrous THF were put into a reaction bottle under nitrogen. The reaction bottle was cooled to a temperature of −78° C., 11 mmol of n-butyl lithium was then slowly added into the reaction bottle to stir at −78° C. for 2 hours, 12 mmol of trimethoxyborane was then added into the reaction bottle to stir for 30 minutes, and hydrochloric acid solution was then added into the reaction bottle to stop the reaction. The resulting mixture was extracted by ethyl acetate and water to collect an organic layer of the extraction. The organic layer was washed by water and saturated saline, dried by anhydrous magnesium sulfate, and then vacuum concentrated to obtain a white solid boride 18 (yield=80%).

2 mmol of the bromide 10, 2 mmol of the boride 18, 0.1 mmol of Pd(PPh$_3$)$_4$, 6 mmol of Na$_2$CO$_3$, and 20 mL of IPA were put into a reaction bottle under nitrogen. The mixture in the reaction bottle was refluxed to react overnight, and then cooled to room temperature. The resulting mixture was vacuum filtered to collect filtrate. The filtrate was vacuum concentrated to obtain crude. The crude was purified by chromatography of a silica column with n-hexane/ethyl acetate eluent to obtain a white solid 2OB(F)B(FF)BVTf (yield=70%). The above reaction is shown as Formula 7. The white solid 2OB(F)B(FF)BVTf had a dielectric anisotropy (Δ∈) of −4.77, a birefringent index (Δn) of 0.262, and a clearing point of 145.0° C. The white solid 2OB(F)B(FF)BVTf was mixed with a liquid-crystal mixture Host-2 as described below to measure its dielectric anisotropy (Δ∈) and the birefringent index (Δn), and the dielectric anisotropy (Δ∈) and the birefringent index (Δn) of the white solid 2OB(F)B(FF)BVTf was then calculated by extrapolation. The white solid 2OB(F)B(FF)BVTf has a spectrum: $^1$H NMR (400 MHz, CDCl$_3$): (ppm); 7.62 (d, J=7.4 Hz, 2H), 7.60 (d, J=7.9 Hz, 2H), 7.38-7.25 (m, 4H), 7.06 (t, J=8.6 Hz, 1H), 6.02 (s, 1H), 5.87 (s, 1H), 4.18 (q, J=7.0 Hz, 2H), 1.50 (t, J=7.0 Hz, 3H).

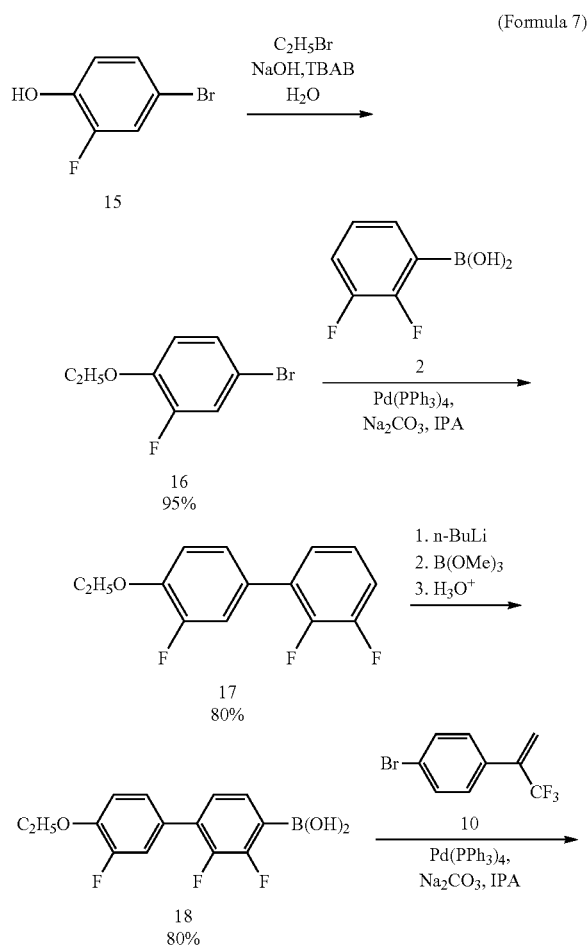

(Formula 7)

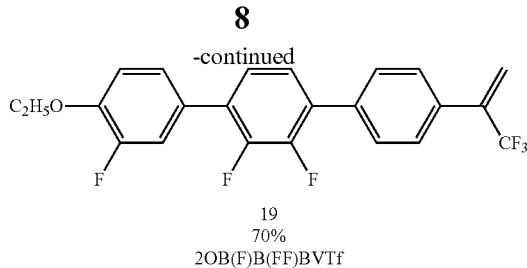

19
70%
2OB(F)B(FF)BVTf

Example 3

100 mmol of 2,3-difluorophenol (20), 2 mL of acetic acid, and 25 mL of dichloromethane were put into a reaction bottle. The reaction bottle was cooled to a temperature of −15° C., and 110 mmol of bromine water was then slowly added into the reaction bottle to stir at −15° C. for 1 hour. The resulting mixture was vacuum distillated to remove residue bromine water and dichloromethane thereof, and then recrystallized by dichloromethane to form white solid 21 (yield=82%).

100 mmol of the white solid 21, 200 mol of bromoethane, 200 mmol of sodium hydroxide, 1 mmol of TBAB, and 30 mL of water were put into a reaction bottle, and then heated to 70° C. to react overnight. The reaction was cooled to room temperature, and then extracted by ethyl acetate and water to collect an organic layer of the extraction. The organic layer was dried by anhydrous magnesium sulfate, and then vacuum concentrated to obtain a pale yellow liquid 22 (yield=95%).

50 mmol of the pale yellow liquid 22 and 50 mL of anhydrous THF were put into a reaction bottle under nitrogen. The reaction bottle was cooled to a temperature of −78° C., 55 mmol of n-butyl lithium was then slowly added into the reaction bottle to stir at −78° C. for 2 hours, 60 mmol of trimethoxyborane was then added into the reaction bottle to stir for 30 minutes, and hydrochloric acid solution was then added into the reaction bottle to stop the reaction. The resulting mixture was extracted by ethyl acetate and water to collect an organic layer of the extraction. The organic layer was dried by anhydrous magnesium sulfate, and then vacuum concentrated to obtain crude. The crude was purified by recrystalliztion of n-heptane and toluene to collect a white solid boride 23 (yield=63%).

25 mmol of 2,3-difluorobromobenzene (24), 25 mmol of the boride 2, 0.5 mmol of Pd(PPh$_3$)$_4$, 75 mmol of Na$_2$CO$_3$, and 50 mL of IPA were put into a reaction bottle under nitrogen. The mixture in the reaction bottle was refluxed to react overnight, and then cooled to room temperature. The resulting mixture was vacuum filtered to collect filtrate. The filtrate was vacuum concentrated to obtain crude. The crude was purified by chromatography of a silica column with n-hexane/ethyl acetate eluent to obtain a white solid 25 (yield=83%).

20 mmol of the pale yellow liquid 25 and 50 mL of anhydrous THF were put into a reaction bottle under nitrogen. The reaction bottle was cooled to a temperature of −78° C., 25 mmol of n-butyl lithium was then slowly added into the reaction bottle to stir at −78° C. for 2 hours, 30 mmol of trimethoxyborane was then added into the reaction bottle to stir for 30 minutes, and hydrochloric acid solution was then added into the reaction bottle to stop the reaction. The resulting mixture was extracted by ethyl acetate and water to collect an organic layer of the extraction. The organic layer was washed by water and saturated saline, dried by anhydrous magnesium sulfate, and then vacuum concentrated to obtain a white solid boride 26 (yield=63%).

3 mmol of the bromide 10, 3 mmol of the boride 26, 0.15 mmol of Pd(PPh$_3$)$_4$, 9 mmol of Na$_2$CO$_3$, and 20 mL of IPA were put into a reaction bottle under nitrogen. The mixture in the reaction bottle was refluxed to react overnight, and then cooled to room temperature. The resulting mixture was vacuum filtered to collect filtrate. The filtrate was vacuum concentrated to obtain crude. The crude was purified by chromatography of a silica column with n-hexane/ethyl acetate eluent to obtain a white solid 2OB(FF)B(FF)BVTf (yield=55%). The above reaction is shown as Formula 8. The white solid 2OB(FF)B(FF)BVTf had a dielectric anisotropy (Δ∈) of −6.77, a birefringent index (Δn) of 0.294, and a clearing point of 124.8° C. The white solid 2OB(FF)B(FF)BVTf was mixed with a liquid-crystal mixture Host-2 as described below to measure its dielectric anisotropy (Δ∈) and the birefringent index (Δn), and the dielectric anisotropy (Δ∈) and the birefringent index (Δn) of the white solid 2OB(F)B(FF)BVTf was then calculated by extrapolation. The white solid 2OB(F)B(FF)BVTf has a spectrum: $^1$H NMR (400 MHz, CDCl$_3$): δ 7.63 (d, J=7.3, 2H), 7.60 (d, J=7.9 Hz, 2H), 7.30-7.10 (m, 3H), 6.84 (td, J=7.7 Hz, 1.8 Hz, 1H), 6.03 (s, 1H), 5.88 (s, 1H), 4.20 (q, J=7.0 Hz, 2H), 1.52 (t, J=3.5 Hz, 3H).

(Formula 8)

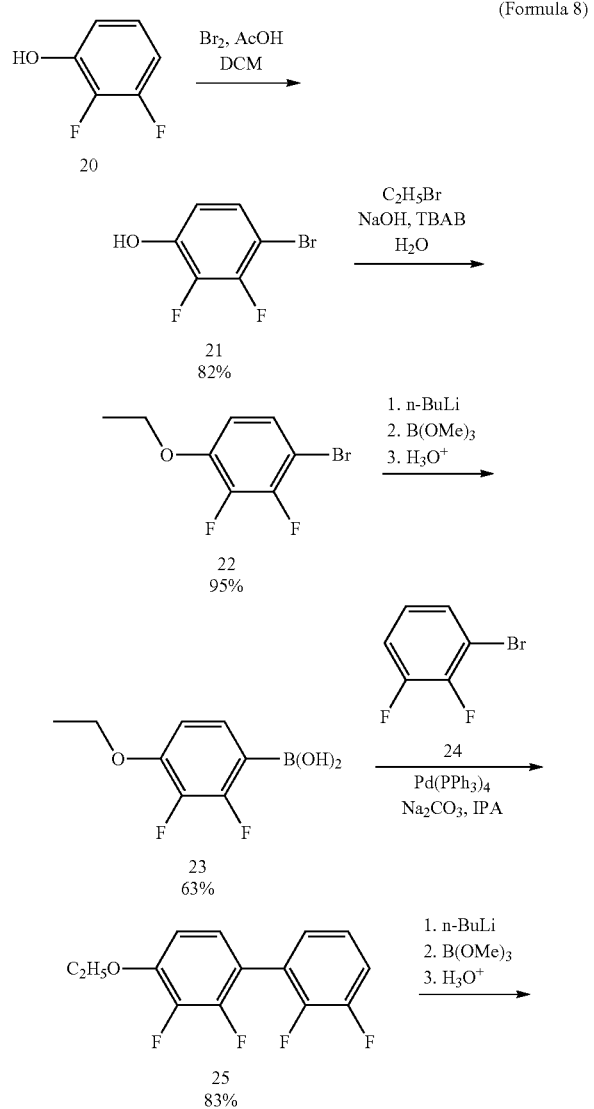

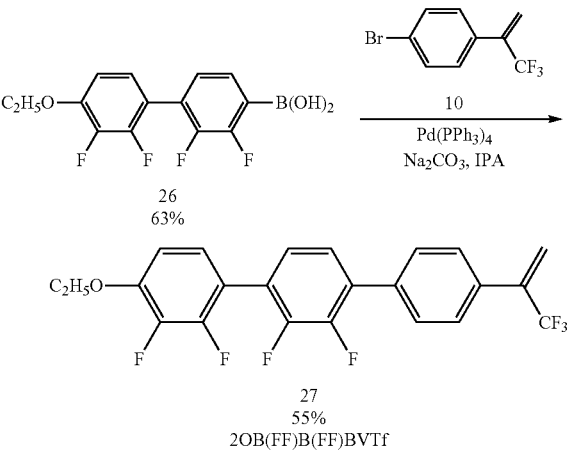

Example 4

Preparation of Liquid-Crystal Mixture

Commercially available liquid-crystal compounds were mixed in different ratios to form liquid-crystal mixtures Host-1 and Host-2. The structure and the weight ratio of the liquid-crystal compounds were tabulated as below.

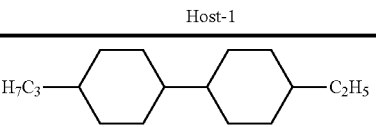

-continued

Host-1

[Chemical structure: H₇C₃-cyclohexyl-cyclohexyl-phenyl(3,4,5-trifluoro)] 15 wt %

Host-2

[Chemical structure: H₇C₃-cyclohexyl-cyclohexyl-C₂H₅] 15 wt %

[Chemical structure: H₇C₃-cyclohexyl-cyclohexyl-C₅H₁₁] 13 wt %

[Chemical structure: H₇C₃-cyclohexyl-CH₂CH₂-phenyl(2,3-F₂)-OC₂H₅] 25 wt %

[Chemical structure: H₇C₃-cyclohexyl-cyclohexyl-phenyl(2,3-F₂)-OC₂H₅] 12 wt %

[Chemical structure: H₉C₄-cyclohexyl-cyclohexyl-phenyl(2,3-F₂)-OC₂H₅] 8 wt %

[Chemical structure: H₅C₂-cyclohexyl-phenyl-phenyl(F,F)-OC₂H₅] 17 wt %

[Chemical structure: H₇C₃-cyclohexyl-phenyl-phenyl(F,F)-OC₂H₅] 10 wt %

The liquid-crystal mixture Host-1 was mixed with different weight ratios of the above mentioned liquid-crystal compounds with negative dielectric anisotropy 4BB(FF)BVTf, 2OB(F)B(FF)BVTf, and 2OB(FF)B(FF)BVTf. The clearing points (Tc), dielectric anisotropy ($\Delta\epsilon$), threshold voltage (Vth), and birefringent index ($\Delta n$) of the mixtures are tabulated in Table 1. As shown in Table 1, the birefringent indexes of the liquid-crystal mixtures including the liquid-crystal compounds with negative dielectric anisotropy were 2% to 8% higher than that of the liquid-crystal mixture Host-1 alone.

TABLE 1

| Monomer (wt %)/Formula | Tc | $\Delta\epsilon$ | Vth | $\Delta n$ |
|---|---|---|---|---|
| Host-1 | 76 | −2.21 | 3.058 | 0.104 |
| 5% 4BB(FF)BVTf/Host-1 | 76.1 | −2.125 | 3.047 | 0.109 |
| 2.5% 2OB(F)B(FF)BVTf/Host-1 | 77 | −2.255 | 3.056 | 0.108 |
| 2.5% 2OB(FF)B(FF)BVTf/Host-1 | 76 | −2.305 | 3.058 | 0.108 |

The liquid-crystal mixture Host-2 was mixed with different weight ratios of the above mentioned liquid-crystal compounds with negative dielectric anisotropy 4BB(FF)BVTf, 2OB(F)B(FF)BVTf, and 2OB(FF)B(FF)BVTf. The clearing points (Tc), dielectric anisotropy ($\Delta\epsilon$), threshold voltage (Vth), and birefringent index ($\Delta n$) of the mixtures are tabulated in Table 2. As shown in Table 2, the birefringent indexes of the liquid-crystal mixtures including the liquid-crystal compounds with negative dielectric anisotropy were 2% to 8% higher than that of the liquid-crystal mixture Host-1 alone.

TABLE 2

| Monomer (wt %)/Formula | Tc | $\Delta\epsilon$ | Vth | $\Delta n$ |
|---|---|---|---|---|
| Host-2 | 75.9 | −2.53 | 3.05 | 0.090 |
| 5% 4BB(FF)BVTf/Host-2 | 75.3 | −2.473 | 3.039 | 0.097 |
| 2.5% 2OB(F)B(FF)BVTf/Host-2 | 76 | −2.586 | 3.046 | 0.094 |
| 2.5% 2OB(FF)B(FF)BVTf/Host-2 | 75.4 | −2.636 | 3.041 | 0.095 |

Figure 3:
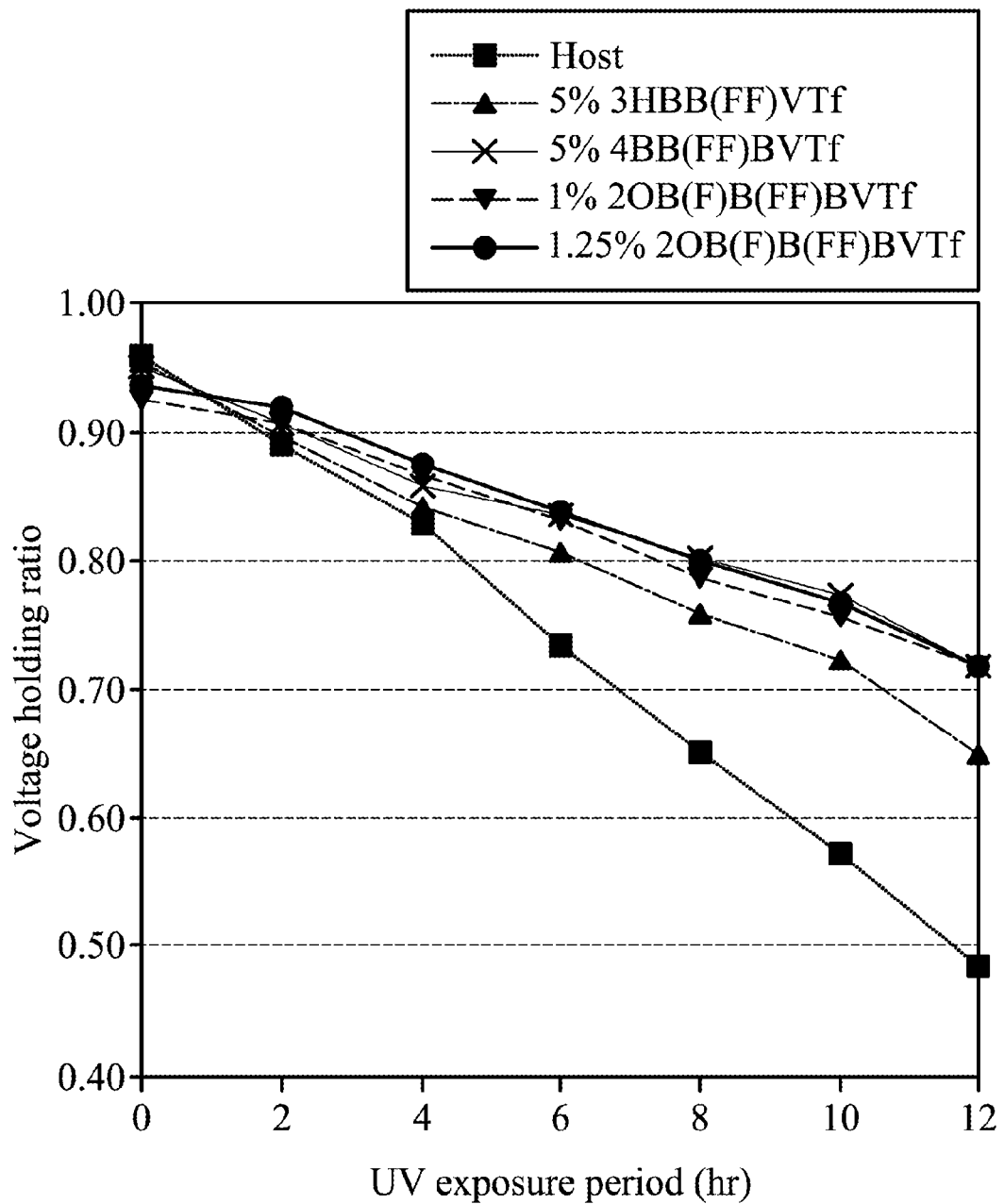
FIG. 3 shows curves of voltage holding ratios (VHR) of liquid-crystal formulae versus UV exposure period in one embodiment of the disclosure.

The liquid-crystal mixture Host-2 was mixed with different weight ratios of the above mentioned liquid-crystal compounds with negative dielectric anisotropy 4BB(FF)BVTf, 2OB(F)B(FF)BVTf, and 2OB(FF)B(FF)BVTf, as shown in Table 3. The liquid-crystal mixtures were exposed to UV of 254 nm to record their voltage holding ratio (VHR) after different exposure periods, as shown in FIG. 3. As shown in Table 3 and FIG. 3, the VHRs of the liquid-crystal mixtures including the liquid-crystal compounds with negative dielectric anisotropy were greatly higher than that of the liquid-crystal mixture Host-2 alone. In other words, the liquid-crystal compounds with negative dielectric anisotropy in the examples may enhance the stability of the liquid-crystal mixture under UV exposure.

TABLE 3

| monomer(wt %)/Formula | VHR before UV exposure | VHR after UV exposure for 12 hours | VHR reduction ratio |
|---|---|---|---|
| Host-2 | 0.96 | 0.49 | 49% |
| 5% 4BB(FF)BVTf/Host-2 | 0.95 | 0.72 | 24% |
| 1% 2OB(F)B(FF)BVTf/Host-2 | 0.93 | 0.72 | 23% |
| 1.25% 2OB(FF)B(FF)BVTf/Host-2 | 0.94 | 0.72 | 23% |

The liquid-crystal compounds with negative dielectric anisotropy could be used alone or collocated with other liquid-crystal molecules (e.g. commercially available product). Because the liquid-crystal compounds with negative dielectric anisotropy in the examples had an inherent liquid-crystal phase and an excellent solubility, they were easily mixed with commercially available liquid-crystal molecules without precipitation. In addition, the liquid-crystal compounds with negative dielectric anisotropy in the examples had a broad nematic phase temperature range, low viscosity, low driving voltage, fast response speed, high stability under UV exposure, thereby being suitable for VA mode LCDs to efficiently improve their performance. The VA mode LCDs could be transmissive, reflective, or transflective.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A liquid-crystal compound with negative dielectric anisotropy, having the chemical formula:

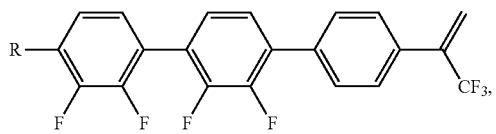

wherein R is $C_{1-8}$ alkoxy group.

2. A liquid-crystal display, comprising:
a top substrate;
a bottom substrate; and
a liquid-crystal layer disposed between the top substrate and the bottom substrate;
wherein the liquid-crystal layer comprises the liquid-crystal compound with negative dielectric anisotropy as claimed in claim 1.

3. An optoelectronic device, comprising the liquid-crystal display as claimed in claim 2.

* * * * *